US008346238B2

(12) United States Patent
Shaffer et al.

(10) Patent No.: US 8,346,238 B2
(45) Date of Patent: Jan. 1, 2013

(54) MESH COMMUNICATION NETWORK AND DEVICES

(75) Inventors: Shmuel Shaffer, Palo Alto, CA (US); Labhesh Patel, San Francisco, CA (US); Ramanathan T. Jagadeesan, San Jose, CA (US); Bich T. Nguyen, Los Altos, CA (US); Gregory D. Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1433 days.

(21) Appl. No.: 11/929,550

(22) Filed: Oct. 30, 2007

(65) Prior Publication Data

US 2009/0111456 A1    Apr. 30, 2009

(51) Int. Cl.
*H04W 4/00* (2009.01)

(52) U.S. Cl. ............... 455/422.1; 455/41.2; 455/67.11; 455/445; 455/550.1

(58) Field of Classification Search ............ 455/41.2, 455/67.11, 403, 422.1, 445, 550.1, 517; 370/338, 370/328
See application file for complete search history.

(56) References Cited

U.S. PATENT DOCUMENTS

| | | | |
|---|---|---|---|
| 5,528,583 A | 6/1996 | Acampora et al. | 370/54 |
| 5,963,650 A * | 10/1999 | Simionescu et al. | 705/63 |
| 6,167,035 A | 12/2000 | Veeravalli et al. | 370/331 |
| 6,381,471 B1 | 4/2002 | Dvorkin | 455/552 |
| 7,231,330 B2 | 6/2007 | Hernandez-Mondragon et al. | 703/2 |
| 7,260,416 B2 | 8/2007 | Shippee | 455/552.1 |
| 7,266,099 B2 | 9/2007 | Roy et al. | 370/331 |
| 7,415,208 B1 * | 8/2008 | Haggans et al. | 398/57 |
| 7,649,872 B2 * | 1/2010 | Naghian et al. | 370/338 |
| 7,688,808 B2 * | 3/2010 | Ren et al. | 370/352 |
| 2004/0125776 A1 * | 7/2004 | Haugli et al. | 370/338 |
| 2005/0176401 A1 * | 8/2005 | Nanda et al. | 455/403 |
| 2006/0245442 A1 * | 11/2006 | Srikrishna et al. | 370/406 |
| 2007/0081507 A1 * | 4/2007 | Koo et al. | 370/338 |
| 2007/0254670 A1 * | 11/2007 | Kawaguchi et al. | 455/445 |
| 2007/0275655 A1 * | 11/2007 | Iwamoto et al. | 455/7 |
| 2007/0298805 A1 * | 12/2007 | Basak et al. | 455/446 |
| 2008/0008159 A1 * | 1/2008 | Bourlas et al. | 370/352 |
| 2008/0080436 A1 * | 4/2008 | Sandhu et al. | 370/338 |
| 2008/0232259 A1 * | 9/2008 | Thomson | 370/242 |
| 2008/0261535 A1 * | 10/2008 | Weil et al. | 455/67.11 |
| 2009/0197624 A1 * | 8/2009 | Kwak et al. | 455/517 |
| 2011/0050457 A1 * | 3/2011 | Billhartz et al. | 340/870.03 |

* cited by examiner

*Primary Examiner* — Cong Tran
(74) *Attorney, Agent, or Firm* — Baker Botts LLP

(57) ABSTRACT

A method for communicating in a wireless communication network includes establishing a first direct communication link with a base transceiver station and communicating data associated with a communication session over the first direct communication link. The method also includes establishing a mesh connection to the base transceiver station. The mesh connection includes at least one mesh communication link with at least one intermediate communication device of a plurality of communication devices in the wireless network, the at least one intermediate communication device communicating with the base transceiver station over a second direct communication link with the base transceiver station. The method further includes switching between communicating data associated with the communication session over the first direct communication link and communicating data associated with the communication session over the mesh connection.

25 Claims, 3 Drawing Sheets

MESH COMMUNICATION NETWORK AND DEVICES

TECHNICAL FIELD

This present disclosure relates generally to telecommunication networks.

BACKGROUND

Some communication devices such as cell phones typically operate by communicating directly with one or more base transceiver stations (BTSs) in a wireless network. When the quality of a link to one BTS falls below a threshold level or the quality of a link to another BTS is greater than a current link, the wireless network may initiate a handoff procedure between BTSs. While handoff may be an effective means to maintain service when a user moves between cells, it may be insufficient when direct communication to a BTS tower in a wireless network is impaired. Such situations may arise when a communication device enters a tunnel, basement, or urban canyon.

DESCRIPTION OF EXAMPLE EMBODIMENTS

Overview

In one embodiment, a method for communicating in a wireless communication network includes establishing a first direct communication link with a base transceiver station and communicating data associated with a communication session over the first direct communication link. The method also includes establishing a mesh connection to the base transceiver station. The mesh connection includes at least one mesh communication link with at least one intermediate communication device of a plurality of communication devices in the wireless network, the at least one intermediate communication device communicating with the base transceiver station over a second direct communication link with the base transceiver station. The method further includes switching between communicating data associated with the communication session over the first direct communication link and communicating data associated with the communication session over the mesh connection.

In another embodiment, a method for allocating bandwidth in a wireless communication includes determining the quality of a plurality of direct communication links between a plurality of communication devices and a base transceiver station. The method also includes allocating bandwidth to the plurality of communication devices to serve as intermediate communication devices for one or more mesh connections, the allocation based at least on the quality of the plurality of the direct communication links. In certain embodiments, the method includes determining the quality of a plurality of mesh communication links associated with a first intermediate communication device of the plurality of communication devices and allocating bandwidth based at least on the quality of the mesh communication links associated with the first intermediate communication device.

Description

Figure 1:
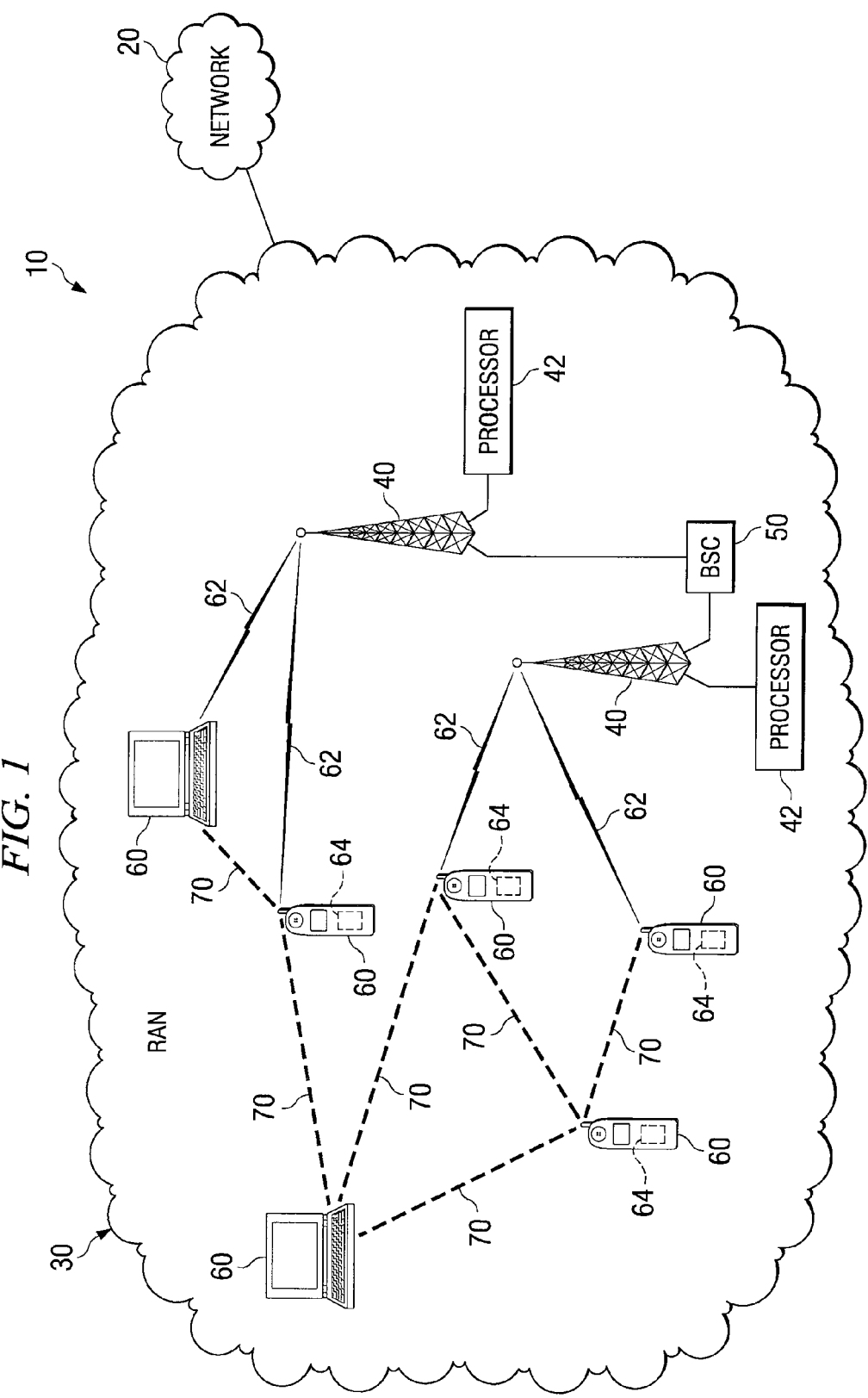
FIG. 1 is a simplified block diagram illustrating a communication system including a wireless communication network in accordance with an embodiment.

FIG. 1 illustrates a communication system 10 for transmitting and receiving multimedia data. The illustrated embodiment includes network 20 and radio access network (RAN) 30. RAN 30 is a wireless communication network and may include any suitable components for facilitating wireless communications. Such components may include, for example, any number of base transceiver stations (BTSs) 40, a base station controller (BSC) 50, communication devices 60, and other communication and network components. In operation, BTS 40 and BSC 50 may support one or more communication sessions between communication devices 60.

As represented in FIG. 1, communication devices 60 may communicate with a BTS 40 directly and/or indirectly. Direct communications may occur over a direct communication link 62. By contrast, communication devices 60 may communicate with a BTS 40 indirectly through a mesh connection which may be implemented using any number of mesh links 70. To facilitate the mesh connection, one or more communication devices 60 may operate as a mesh node which may transmit and/or receive communications to and from one or more communication devices 60. Accordingly, a mesh node may function as an intermediate communication device 60 which indirectly couples one or more other communication devices to a BTS 40 via mesh links 70. In certain embodiments, a communication device 60 may communicate with a BTS 40 over a direct communication link 62 and a mesh connection, simultaneously. Additionally, a communication device 60 may switch between communicating over a direct communication link 62 and a mesh connection based on the quality of the mesh connection and/or direct communication link 62.

Network 20 represents communication equipment, including hardware and any appropriate controlling logic, for interconnecting elements coupled to network 20. In particular, network 20 may enable the communication of audio and/or video telecommunication signals, data, and/or messages, including signals, data, or messages transmitted through text chat, instant messaging, and e-mail. Network 20 may comprise all, or a portion of, a radio access network (RAN), such as RAN 30; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate certain communication capabilities, network 20 may include any combination of gateways, routers, hubs, switches, access points, and any other hardware, software, or any combination of the preceding that may implement any suitable protocol or communication. While the illustrated embodiment indicates that communication system 10 includes a single network 20, communication system 10 may include any number or arrangement of networks 20.

Communications over network 20 may employ any suitable communication protocol. In particular embodiments, network 20 may utilize communication protocols that allow for the addressing or identification of endpoints, nodes, and/or other components coupled to the communication network. For example, using Internet protocol (IP), each of the components coupled together by, network 10 may be identified in information directed using IP addresses. In this manner, network 20 may support any form and/or combination of pointto-point, multicast, unicast, or other techniques for exchanging media packets among components in communication system 10.

RAN 30 represents a wireless communication network which provides an interface between communication devices 60 and network 20. In particular, RAN 30 may provide access services including Layer-2 mobile access, mobility, and/or handoff services within its area of coverage. The communications interface provided by RAN 30 may facilitate the exchange of data and other communications between communication devices 60 and any number of selected elements or components of communication system 10.

In certain embodiments, RAN 30 may be apportioned into one or more cells. A cell may be a basic geographic unit of a wireless communication network. A cell may vary in size depending on terrain, capacity, or other demands and each may be equipped with a transmitter/receiver, such as a BTS 40. The transition from one cell to another may be substantially transparent to the user of a communication device 60. Thus, when a communication device 60 enters into a new geographical area or cell, a handoff procedure may be initiated to allow a communication session to continue without dropping the session or otherwise reducing session quality. Handoff may also occur when a communication device 60 is situated in overlapping cells and the call quality, for example, triggers a handover from the current cell handling the wireless communication to the overlapping cell.

Base transceiver stations (BTSs) 40 represent equipment that supports wireless communications between communication devices 60 and other elements of communication system 10. BTSs 40 may include any number and configuration of devices and components operable to transmit and receive radio signals. In particular, BTSs 40 may include radio towers, antennas, signal processors, signal amplifiers and other suitable equipment for signal management. BTSs 40 may also include encryption and decryption elements for processing communications between components of communication system 10. As illustrated, BTSs 40 each include a processor 42. Processor 42 may execute commands and instructions associated with the services provided by a BTS 40. In operation, processor 42 may be capable of facilitating any of the functionality associated with a BTS 40. Examples of processor 42 include, application-specific integrated circuits (ASICs), field-programmable gate arrays (FGPAs), digital signal processors (DSPs), and any other suitable specific or general purpose processors.

In operation, each BTS 40 may handle or otherwise manage communication sessions within one or more cells of RAN 30. Specifically, each BTS 40 may communicatively couple a communications device 60 located within a serviced cell to one or more elements of communication system 10 through a direct communication link 62. As illustrated in FIG. 1, each direct link 62 is a communication link between a BTS 40 and a communication device 60. To facilitate communications within RAN 30, each BTS 40 may be operable to simultaneously establish and maintain a direct communication link 62 with any number of communication devices 60. While certain components and functionality of BTSs 40 have been provided, a BTS 40 may be any device operable to provide wireless access to a communication network such as RAN 30 or communication network 20.

BSC 50 may operate as management components for a mobile network such as RAN 30. This may be performed through remote commands to a corresponding BTS 40. In certain embodiments, one base station controller 50 may manage more than one base transceiver station 16. Some of the responsibilities of BSC 50 may include management of radio channels and assisting in handover scenarios. To provide the recited functionality, BSC 50 may include any suitable number and combination of processors, memories, and other hardware. BSC 50 may also include software and encoded logic for execution by one or more processors.

Communication devices 60 may represent any suitable combination of hardware, software, and/or encoded logic to provide communication services to a user. For example, communication devices 60 may include telephones; cell phones; computers running telephony, email, or other forms of messaging and/or communication software; end user devices; video monitors; cameras; personal digital assistants (PDAs); or any other communication hardware, software, and/or encoded logic that supports the communication of voice, video, text or other suitable forms of data using communication system 10. Although FIG. 1 illustrates a particular number and configuration of communication devices 60, communication system 10 contemplates any number or arrangement of such components to support communication of media.

Embodiments of communication devices 60 may include any suitable configuration of processors, memory units, interfaces. Communications devices 60 may also include or store software and/or encoded logic for execution by one or more processors 64. A processor 64 may represent any suitable device(s) capable of processing and/or communicating electronic information. In operation, processor 64 may be capable of facilitating any of the functionality recited with respect to communication devices 60. In certain embodiments, communication devices 60 may include a memory unit which stores processor instructions and/or any other appropriate information used by communication devices 60. A memory unit may include any random access memory (RAM) device, dynamic random access memory (DRAM), read only memory (ROM) device, magnetic storage device, optical storage device, flash memory, or any other suitable data storage device(s). In addition, one or more communication devices 60 may have an interface operable to communicate information and signals to and receive information and signals from a communication network 20 or another communication device 60. While specific components of an embodiment of a communication device 60 have been described, a communication device 60 may include any suitable type, number, or arrangement of components configured to provide the recited functionality.

Communications devices 60 may connect to RAN 30 or network 20 using any suitable telecommunication standard or protocol. In particular, communication devices 60 may connect to network 20 and one or more BTSs 40 of RAN 30, using various mobile protocols or standards including, but not limited to code division multiple access (CDMA), CDMA2000, general packet radio service (GPRS), universal mobile telecommunications system (UMTS), evolution-data optimized (EV-DO), wireless fidelity (Wi-Fi) or any combination of the preceding. Communications devices 60 may also be operable to connect to one or more communication networks through a fixed broadband connection such as a digital subscriber line (DSL), cable modem, or Ethernet. Although specific protocols and standards have been provided, various other protocols and standards may be used to connect a communication device 60 with components of communication system 10.

According to an embodiment, communication devices 60 may provide Layer-3 routing capabilities. In particular, one or more communication devices 60 may dynamically establish and/or tear down a mesh network among communication devices 60. A mesh network represents a group of communication devices 60 communicatively coupled by one or more mesh links 70. Each mesh link 70 may be a communications pathway connecting two or more communication devices 60. Communications over a mesh link 70 may utilize any suitable technology or standard for transmitting packets over a wireless interface. In certain embodiments, one or more of the communication devices 60 coupled by mesh links 70 may also be connected to a BTS 40 through a direct communication link 62. The direct communication link 62 which couples the mesh network to a BTS 40 may support the transfer of data from any communication device 60 in the mesh network to the BTS 40. Thus, in certain embodiments, a BTS 40 is operable support multiple communication sessions in a mesh network through a single direct communication link 62.

In operation, each communication device 60 connected by a mesh link 70 may operate as a mesh node which routes, forwards or otherwise distributes data and other communications among the coupled devices. Thus, within a mesh network, a call or other communication need not travel directly between a communication device 60 and a BTS 40, but could travel through one or more auxiliary communication devices 60 within communication system 10. Thus, a mesh network may provide an indirect connection between a communication device 60 and a BTS 40. Specifically, data transmitted by a communication device 60 may travel over any number of mesh links 70 prior to reaching a destination such as a communication device 70 or a BTS 40. Similarly, communications and data transmitted by a BTS 40 may pass through any number of mesh links 70 prior to reaching a destination communication device 60. Additionally, as illustrated, a communication device 60 may communicatively connect to multiple auxiliary communication devices 60 within RAN 30 over multiple mesh links 70. Although FIG. 1 provides a certain number and configuration of mesh links 70 between certain communication devices 60, a mesh link 70 may be established between any number of communication devices 60.

A mesh connection or network may be established by one or more communication devices 60 or a BTS 40. For example, a first communication device 60 may request a second communication device 60 to initiate a mesh link 70 between the two devices. Similarly, a BTS 40 may signal or otherwise request multiple communication devices 60 to establish one or more mesh links 70. In certain embodiments, a user of a communication device 60 situated within an existing mesh network may elect whether to allow the communication device 60 to serve as a mesh node. A user may, for example, decide whether to allow a communication device 60 to join a network mesh on a case-by-case basis. Thus, each time another communication device 60 requests to establish a mesh link, the user may be prompted or otherwise notified of the request. Alternatively, a user's preferences may be enforced generally pursuant to an implemented policy. For example, a policy might dictate that a communication device 60 may only serve as a mesh node if the user is not currently engaged in a communication session.

In an embodiment, communication devices 60 may monitor, compare, and switch between existing or potential communication links with various components of communication system 10. For example, a communication device may monitor the quality of one or more direct communication links 62 with one or more BTSs 40. Similarly, communication devices 60 may also monitor one or more potential mesh links 70 with any number of communication devices 60 functional to serve as nodes in a mesh network. Communication devices 60 may thereby compare the quality of one or more of the links and switch between a mesh link 70 or direct communication link 62 based on the communication link having the highest quality. In some embodiments, a communication device 60 may initiate communications over a mesh link 70 when a direct communication link 62 with a BTS 40 falls below a threshold quality of service (QoS) level. In certain embodiments, communication devices 60 may preemptively implement an ad hoc mesh network or connection to a BTS 40 and monitor the link quality over the direct and mesh links.

In a further embodiment, a communication device 60 may elect to maintain a direct communication link 62 and a mesh connection to a BTS 40 simultaneously. Accordingly, macrodiversity frame-selection may be enabled, whereby a communication device 60 may evaluate frames directly received from a BTS 40 and from one or more communication devices 60 within the mesh. The redundancy which multiple communication paths provide may facilitate error detection and correction or any other optimization technique. To illustrate, a communication device 60 may continuously compare data received over a mesh connection and a direct communication link 62. During a particular communication session, the communication device 60 may determine that one or more media packets were not received over either the direct communication link 62 or the mesh connection. Accordingly, if the one or more media packets were not received over the direct communication link 62, then communication device 60 may replace those media packets with media packets that were received over the mesh connection. Likewise, if one or more media packets were not received over the mesh connection, then communication device 60 may replace those media packets with one or media packets that were received over the direct communication link 62. Thus, communication device 60 may be operable to reconstruct a media stream associated with a particular communication session. Such reconstruction may provide enhanced quality of service as total media data loss may be minimized.

In certain embodiments, communication devices 60 may be compensated and/or billed for participating in a mesh network. For example, if a communication device 60 is transmitting data generated by the communication device 60 over a mesh connection, the user may be billed for the communications. In such situations, a user may be prompted with an option whether to link to a BTS 40 directly over a direct communication link 62 or indirectly through one or more mesh links 70. By contrast, if a communication device 60 is serving as a mesh node and routing data directed to another communication device 60 or generated by another communication device 60, then the user of the intermediate communication device 60 may be compensated. Additionally, in a particular embodiment, the user of the intermediate communication device 60 may be prompted with a request to serve as a mesh node. In response to a command from the user, the intermediate communication device 60 may establish a mesh link 70 with the requesting communication device 60.

According to another embodiment, bandwidth or other resources may be dynamically allocated among communication devices 60. For example, a BTS 40 and/or BSC 50 may allocate bandwidth to communication devices 60 based on the quality of the direct communication link 62 each has with the BTS 40. Providing the communication device 60 having the strongest link quality with the most bandwidth, may maximize network throughput. In certain embodiments, BTS 40 may provide a communication device 60 associated with the most mesh links 70 with increased bandwidth. In some embodiments, a BTS 40 and/or BSC 50 may allocate extra bandwidth to the communication device 60 which is positioned so as to best serve as a mesh node. Such a device may be the one associated with the highest quality existing or potential mesh links 70. In a further embodiment, a BTS 40 and/or BSC 50 may allocate bandwidth according to an algorithm based on any combination of the recited bandwidth allocation schemes.

Figure 2:
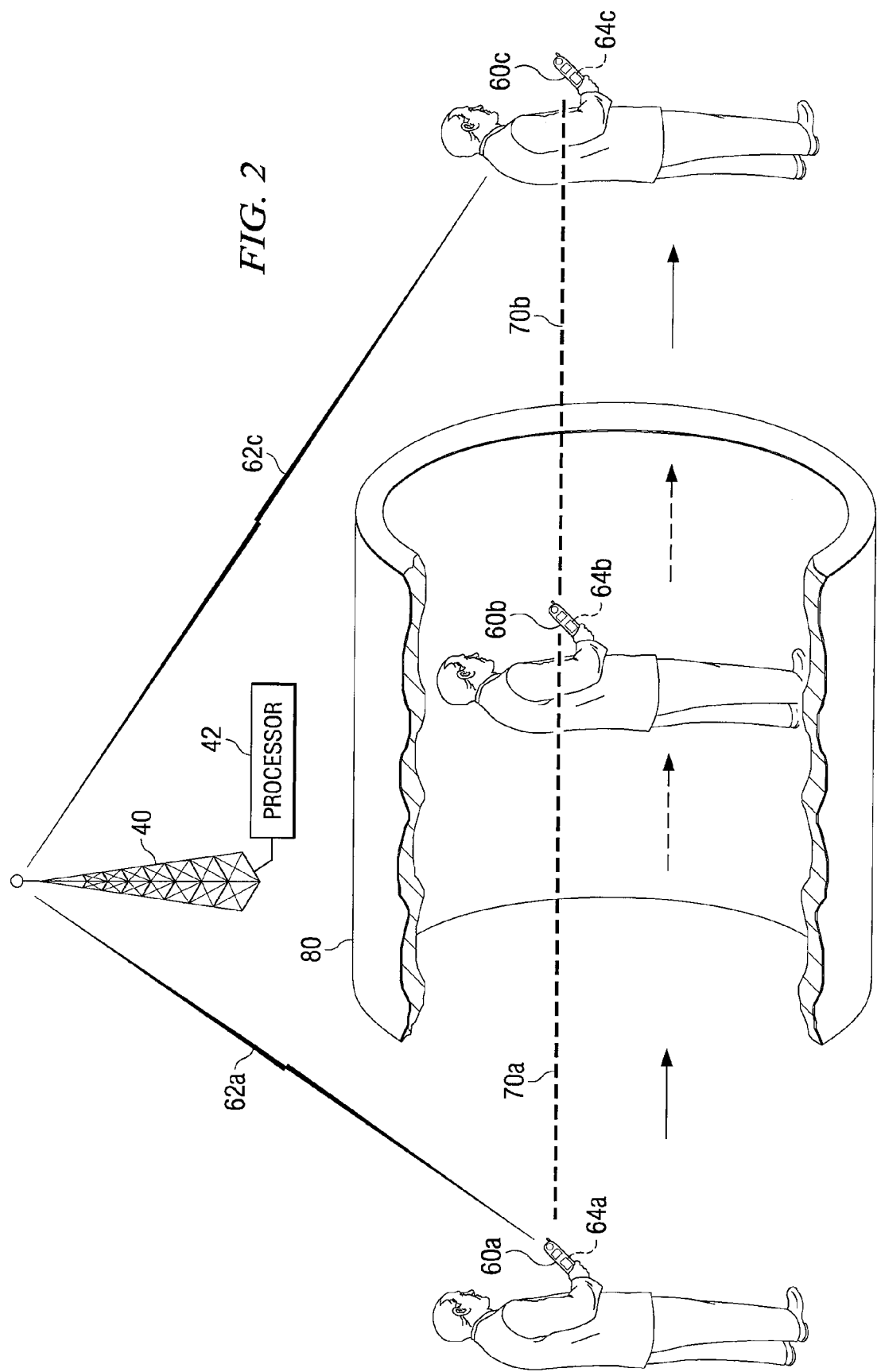
FIG. 2 is a simplified block diagram illustrating a handover situation in a wireless communication network according to a particular embodiment.

FIG. 2 illustrates a handover example wherein a communication device 60 switches between a mesh connection and a direct communication link 62. In particular, FIG. 2 depicts a plurality of communication devices 60*a*-60*c* which are entering a tunnel 80, located in tunnel 80, and exiting tunnel 80, respectively. When a communication device, such as communication device 60*b*, is located in tunnel 80, a direct communication link 62 with BTS 40 may be obstructed. Accordingly, a mesh connection through one or more mesh links 70 may be necessary to initiate or maintain a communication session supported by BTS 40. It should be noted that communication devices 60*a*-60*c* may be substantially similar to communication devices 60 described with respect to FIG. 1. Similarly, mesh links 70*a*-70*b*, and direct communication links 62*a* and 62*c* may be substantially similar to mesh links 70 and direct communication links 62.

As illustrated in FIG. 2, communication devices 60*a*-60*c* may engage in communication sessions supported by BTS 40. For example, communication device 60*c* may directly connect to BTS 40 over direct communication link 62*c*. By contrast, communication device 60*b* may be obstructed from establishing a direct communication link 62 to BTS 40 because it is within tunnel 80. Accordingly, communication device 60*b* may communicatively couple to BTS 40 via mesh link 70*b*, communication device 60*c*, and direct communication link 62*c*. Communication device 60*a* may connect to BTS 40 by direct communication link 62*a* or by engaging in a mesh connection through communication devices 60*b*-60*c* over mesh links 70*a*-70*b* and direct communication link 62*c*.

As mentioned, communication devices 60*a*-60*c* may switch between communicating over a direct communication link 62 and a mesh connection over mesh links 70. To illustrate, assume communication device 60*a* is in a handover procedure between direct communication link 62*a* and mesh link 70*a*. In particular, as communication device 60*a* approaches and begins to enter tunnel 80, the signal quality associated with direct communication link 62*a* may begin to deteriorate. Thus, switching to or establishing a mesh connection to BTS 40 may be necessary to maintain a communication session. In response to the deteriorating signal over direct communication link 62*a*, communication device 60*a* may search for a previously established mesh network between auxiliary communication devices such as communication devices 60*b* and 60*c*. Alternatively, communication device 60*a* may signal communication devices 60*b* and 60*c* to initiate a mesh network. As another example, communication device 60*a* may signal BTS 40 to request or signal communication devices 60 within its communication cell to establish a mesh network. Notwithstanding the method for initiating the mesh network, communication device 60*a* may establish mesh link 70*a* with communication device 60*b*. It should be noted that in certain embodiments mesh link 70*a* may be established before the signal over direct communication link 62*a* begins to deteriorate. Once the mesh connection involving mesh links 70*a*-70*b* and direct communication link 62*c* is established, communication device 60*a* may route data associated with a communication session through mesh link 70*a* rather than (or in addition to) through direct communication link 62*c*. Thus, when communication device 60*a* enters tunnel 80 and direct communication link 62*a* is interrupted, the device may maintain a previously established communication session and/or initiate a new communication session supported by BTS 40.

Figure 3:
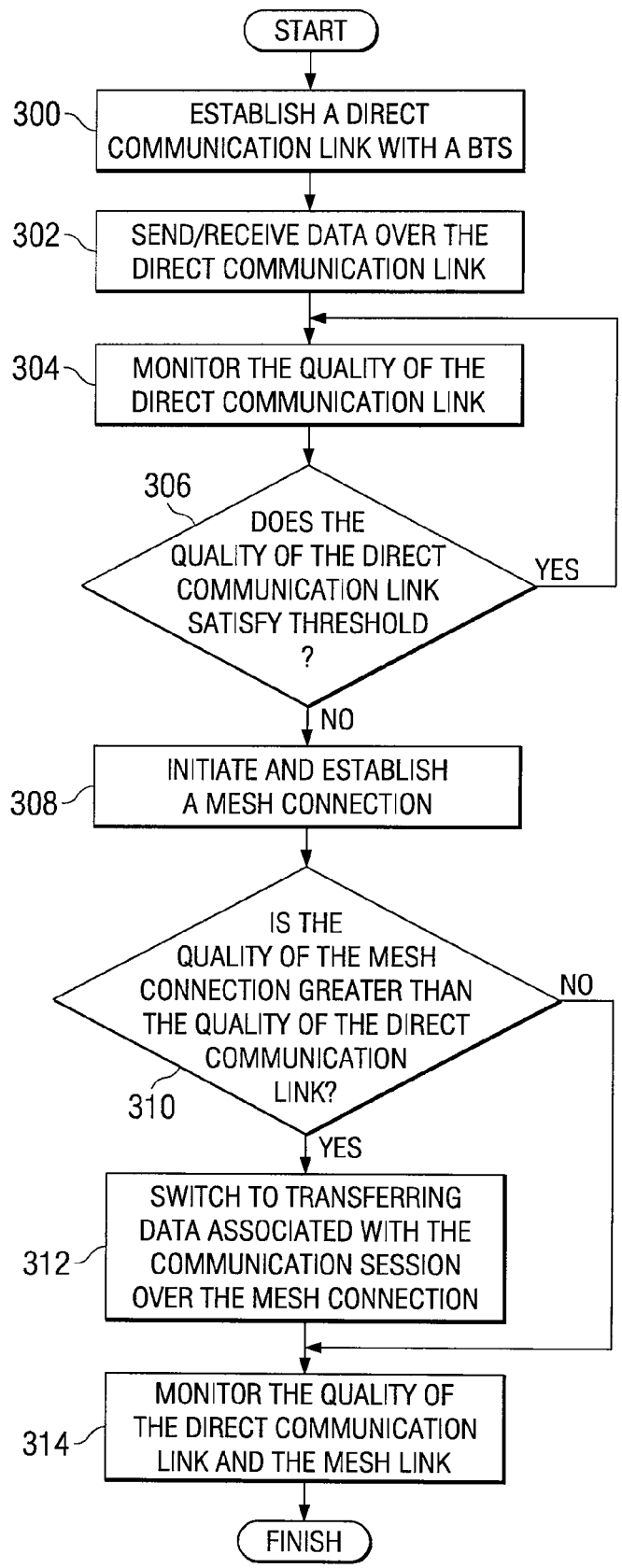
FIG. 3 is a flow chart illustrating a method for communicating in a wireless communication network.

FIG. 3 is a flow chart describing a method for communicating in a wireless communication network in accordance with a particular embodiment. In the described process, a communication device 60 switches from communicating over a direct communication link 62 to communication over a mesh connection through one or more mesh links 70.

The described process begins at step 300, wherein a communication device 60 establishes a direct communication link 62 with a BTS 40. The direct communication link 62 may facilitate the transfer of multimedia data associated with a communication session involving communication device 60 or a communication session associated with any number of auxiliary communication devices 60 within the wireless network. Once direct communication link 62 is established, communication device 60 may send and receive data associated with a communication session over direct communication link 62 at step 302.

At step 304 communication device 60 may monitor the quality of direct communication link 62. In certain embodiments, communication device 60 may also monitor the quality of one or more mesh links 70 coupling one or more auxiliary communication devices 60 in the wireless network. The quality of a communication link may be based on, for example, signal strength, bandwidth, data transfer rate or any combination of the preceding. At step 306, communication device 60 may determine whether the quality of direct communication link 62 satisfies a threshold level. The threshold level may be a certain quality level of direct communication link 62 or may be based on the quality of a mesh link 70. In certain embodiments, the threshold level may be based on the quality of a potential mesh link 70 with one or more auxiliary communication devices within the communication network. If the quality of direct communication link 62 satisfies the threshold level, then the process may return to step 304.

In response to the quality of direct communication link 62 falling below a threshold level, communication device 60 may initiate and establish a mesh connection at step 308. A mesh connection may include one or more mesh links 70 which indirectly couple communication device 60 to BTS 40 through one or more intermediate communication devices 60. As discussed, a mesh link 70 may be a communication link between a pair of communication devices 60. It should be noted that in particular embodiments, a BTS 40 may initiate the establishment of one or more mesh links 70. It should also be noted that in one example embodiment the mesh network is always activated.

Next, at step 310, communication device 60 may determine whether the quality of the mesh connection 70 is greater than the quality of the direct link 62. In certain embodiments, this determination may be based on the quality of a plurality of mesh links 70 which couple communication device 60 to BTS 40. If the quality of the mesh connection is greater than the quality of direct communication link 62, then communication device 60 may switch to communicating data associated with the communication session over the mesh connection at step 312. By contrast, if the quality of the mesh connection is not greater than the quality of direct link 62, then communication device 60 may continue to send and receive data associated with the communication session over direct communication link 62. Whether or not communication device 60 switches to communicating over the mesh connection, communication device 60 may proceed to monitor the quality of the mesh connection and direct communication link 62 at step 314.

Modifications, additions, or omissions may be made to the method depicted in FIG. 3. In certain embodiments, the method may include more, fewer, or other steps. For example, communication device 60 may establish a mesh connection 70 to a BTS 40 prior to the quality of a direct link 62 falling below a threshold quality level. In addition, communication device 60 may simultaneously communicate over the mesh connection 70 and direct link 62 as opposed to switching between the two communication pathways. It should also be noted that steps may be performed in any suitable order without departing from the scope of the disclosure.

While certain embodiments have been described in detail numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

What is claimed is:

1. A method comprising:
    establishing a first direct communication link with a base transceiver station;
    communicating data associated with a communication session over the first direct communication link;
    establishing a mesh connection to the base transceiver station, the mesh connection comprising at least one mesh communication link with at least one intermediate communication device of a plurality of communication devices in a wireless network, the at least one intermediate communication device communicating with the base transceiver station over a second direct communication link with the base transceiver station; and
    switching between communicating data associated with the communication session over the first direct communication link and communicating data associated with the communication session over the mesh connection.

2. The method of claim 1, further comprising monitoring the quality of the first direct communication link.

3. The method of claim 2, further comprising:
    determining that the quality of the first direct communication link does not satisfy a threshold value; and
    wherein switching between communicating data associated with the communication session over the first direct communication link and communicating data associated with the communication session over the mesh connection comprises switching between communicating data associated with the communication session over the first direct communication link and communicating data associated with the communication session over the mesh connection in response to determining that that the quality of the first direct communication link does not satisfy the threshold value.

4. The method of claim 2, further comprising:
    determining that the quality of the first direct communication link does not satisfy a threshold value; and
    wherein establishing a mesh connection to the base transceiver station comprises establishing a mesh connection to the base transceiver station in response to determining that the quality of the first direct communication link does not satisfy the threshold value.

5. The method of claim 1, further comprising simultaneously communicating data associated with the communication session over the first direct communication link and the mesh connection.

6. The method of claim 5, further comprising:
    comparing the data communicated over the first direct communication link with the data communicated over the mesh connection;
    determining that one or more packets of data were not received over either the first direct communication link or the mesh connection;
    if the one or more packets of data were not received over the first direct communication link, replacing the one or more packets of data that were not received over the first direct communication link with one or more packets of data that were received over the mesh connection; and
    if the one or more packets of data were not received over the mesh connection, replacing the one or more packets of data that were not received over the mesh connection with one or more packets of data that were received over the first direct communication link.

7. The method of claim 1, further comprising:
    receiving a command from a user to communicate data over the mesh connection; and
    wherein communicating data associated with the communication session over the mesh connection comprises communicating data associated with the communication session over the mesh connection in response to receiving a command from a user to communicate data over the mesh connection.

8. The method of claim 1, further comprising billing in response to communicating data over the mesh connection.

9. A method comprising:
    determining the quality of a plurality of direct communication links between a plurality of communication devices and a base transceiver station; and
    allocating bandwidth to the plurality of communication devices to serve as intermediate communication devices for one or more mesh connections, the allocation based at least on the quality of the plurality of the direct communication links.

10. The method of claim 9, further comprising:
    determining the quality of a plurality of mesh communication links associated with a first intermediate communication device of the plurality of communication devices; and
    allocating bandwidth based at least on the quality of the mesh communication links associated with the first intermediate communication device.

11. The method of claim 9, further comprising:
    determining that a second intermediate communication device of the plurality of communication devices has more mesh communication links; and
    allocating bandwidth to the second intermediate communication device based at least on determining that a second intermediate communication device has more mesh communication links.

12. A method comprising:
    establishing a mesh communication link with a communication device;
    establishing a direct communication link with a base transceiver station;
    receiving data associated with a communication session over the mesh communication link; and
    communicating data associated with the communication session over the direct communication link to the base transceiver station.

13. The method of claim 12, wherein the communication session comprises a first communication session, the method further comprising receiving data associated with a second communication session over the mesh communication link.

14. The method of claim 12, further comprising:
    receiving a request to establish a mesh communication link; and
    wherein establishing a mesh communication link with a communication device comprises establishing a mesh communication link with a communication device in response to receiving a request to establish a mesh communication link.

15. An apparatus comprising a processor operable to:
establish a first direct communication link with a base transceiver station;
communicate data associated with a communication session over the first direct communication link;
establish a mesh connection to the base transceiver station, the mesh connection comprising at least one mesh communication link with at least one intermediate communication device of a plurality of communication devices in a wireless network, the at least one intermediate communication device communicating with the base transceiver station over a second direct communication link with the base transceiver station; and
switch between communicating data associated with the communication session over the first direct communication link and communicating data associated with the communication session over the mesh connection.

16. The apparatus of claim 15, wherein the processor is further operable to monitor the quality of the first direct communication link.

17. The apparatus of claim 16, wherein the processor is further operable to
determine that the quality of the first direct communication link does not satisfy a threshold value; and
wherein a processor operable to switch between communicating data associated with the communication session over the first direct communication link and communicating data associated with the communication session over the mesh connection comprises a processor operable to switch between communicating data associated with the communication session over the first direct communication link and communicating data associated with the communication session over the mesh connection in response to determining that that the quality of the first direct communication link does not satisfy the threshold value.

18. The apparatus of claim 16, wherein the processor is further operable to:
determine that the quality of the first direct communication link does not satisfy a threshold value; and
wherein a processor operable to establish a mesh connection to the base transceiver station comprises a processor operable to establish a mesh connection to the base transceiver station in response to determining that the quality of the first direct communication link does not satisfy the threshold value.

19. The apparatus of claim 15, wherein the processor is further operable to simultaneously communicate data associated with the communication session over the first direct communication link and the mesh connection.

20. The apparatus of claim 19, wherein the processor is further operable to:
compare the data communicated over the first direct communication link with the data communicated over the mesh connection;
determine that one or more packets of data were not received over either the first direct communication link or the mesh connection;
if the one or more packets of data were not received over the first direct communication link, replace the one or more packets of data that were not received over the first direct communication link with one or more packets of data that were received over the mesh connection; and
if the one or more packets of data were not received over the mesh connection, replace the one or more packets of data that were not received over the mesh connection with one or more packets of data that were received over the first direct communication link.

21. The apparatus of claim 15, wherein the processor is further operable to:
receive a command from a user to communicate data over the mesh connection; and
wherein a processor operable to communicate data associated with the communication session over the mesh connection comprises a processor operable to communicate data associated with the communication session over the mesh connection in response to receiving a command from a user to communicate data over the mesh connection.

22. The apparatus of claim 21, wherein the user is a user of the intermediate communication device and the command comprises approval from the user for establishment of the mesh connection.

23. An apparatus comprising a processor operable to:
establish a mesh communication link with a communication device;
establish a direct communication link with a base transceiver station;
receive data associated with a communication session over the mesh communication link; and
communicate data associated with the communication session over the direct communication link to the base transceiver station.

24. The apparatus of claim 23, wherein the communication session comprises a first communication session, the processor further operable to receive data associated with a second communication session over the mesh communication link.

25. The apparatus of claim 23, wherein the processor is further operable to:
receive a request to establish a mesh communication link; and
wherein a processor operable to establish a mesh communication link with a communication device comprises a processor operable to establish a mesh communication link with a communication device in response to receiving a request to establish a mesh communication link.

* * * * *